United States Patent [19]

Sikich

[11] Patent Number: 5,074,897

[45] Date of Patent: Dec. 24, 1991

[54] PARTICULATE CONTAMINATION CONTROL SYSTEM ENCLOSURE

[76] Inventor: Albert H. Sikich, 520 W. Michigan, Gilbert, Minn. 55741

[21] Appl. No.: 674,388

[22] Filed: Mar. 25, 1991

[51] Int. Cl.⁵ .................... B01D 46/10

[52] U.S. Cl. .................... 55/385.2; 55/500; 454/58

[58] Field of Search .................... 55/97, 385.2, 500; 98/1.5

[56] References Cited

U.S. PATENT DOCUMENTS

| | | | |
|---|---|---|---|
| H460 | 5/1988 | Werner | 55/385.2 |
| H785 | 6/1990 | Merritt | 55/97 |
| 4,312,645 | 1/1982 | Mavros et al. | 55/213 |
| 4,604,111 | 8/1986 | Natale | 55/97 |
| 4,801,312 | 1/1989 | Mateson | 55/97 |
| 4,804,392 | 2/1989 | Spengler | 55/385.2 X |
| 4,922,806 | 5/1990 | Newman et al. | 98/1.5 |
| 5,009,685 | 4/1991 | Wilson et al. | 55/385.2 |

*Primary Examiner*—Charles Hart

*Attorney, Agent, or Firm*—Harpman & Harpman

[57] ABSTRACT

A self contained portable negative pressure control system enclosure for protection from airborne asbestos particles and the like from a work space includes an enclosure formed of portable rigid door frames having spring doors and a weighted transom closure within that communicate with the work space to define multiple non-sealed decontamination chambers. The enclosure is used with a room divider or in an access doorway to the work space which is maintained in a negative air pressure by exhaust blowers equipped with HEPA filters.

8 Claims, 3 Drawing Sheets

PARTICULATE CONTAMINATION CONTROL SYSTEM ENCLOSURE

BACKGROUND OF THE INVENTION

1. Technical Field

This device relates to negative air enclosures required for a work space during the removal of hazardous materials that create airborne particles within the work space.

2. Description of Prior Art

Prior Art systems and enclosures of this type have relied on decontamination chambers and work spaces that become sealed under loss of negative air pressure within the work space to trap and hold contaminated air within. A number of isolation devices have been used to prevent outward airflow of the decontaminated air under such loss, see for example U.S. Pat. Nos. 4,604,111, 4,801,312, 4,922,806, and 4,312,645 and U.S. Statutory Registration H460 and Statutory Registration H785.

In U.S. Pat. No. 4,604,111 an enclosure and a temporary wall in which doorways are formed and airflow is controlled by "flap seals" formed of plastic film sheets is shown that will close upon loss of negative air pressure within the work area sealing the same preventing contamination of the outside environment.

U.S. Pat. No. 4,801,312 an airflow hazardous material abatement method and system is disclosed wherein a decontamination enclosure is used having multiple chambers defined by flap sealed door-ways made of sheets of plastic film.

U.S. Pat. No. 4,922,806 refers to a door for negative air pressure enclosure in which access doors used in multiple chambers have flap seals for one-way inflow air movement with controlled door position from fully closed to partially open.

U.S. Pat. No. 4,312,645 a separation assembly having a filter mounted in an air duct so at least a section of the filter element can be moved from a filtering position to a bypass position as disclosed.

In U.S. Statutory Registration H460 a work place and decontamination room having doorways with multiple hinged doors all but one of which is provided with fixed louvers as disclosed.

Finally, in U.S. Statutory Registration H785 a decontamination apparatus and method is disclosed using a decontamination enclosure with multiple doors. Multiple filters are used between chambers to filter all inflow air only to the work space.

SUMMARY OF THE INVENTION

A negative pressure control system enclosure useful in temporarily isolating asbestos removal work areas from adjacent areas utilizing multiple rigid doorway frames and transoms to define decontamination entry and exit chambers. Spring urged doors and hinged transom panels maintain the separation of the work area from the outside environment. The doorway frames are assembled by interconnecting PVC tubing with plastic sheeting enclosing the assembly defining the chambers between the respective doorway frames.

DESCRIPTION OF THE PREFERRED EMBODIMENT

Figure 1:
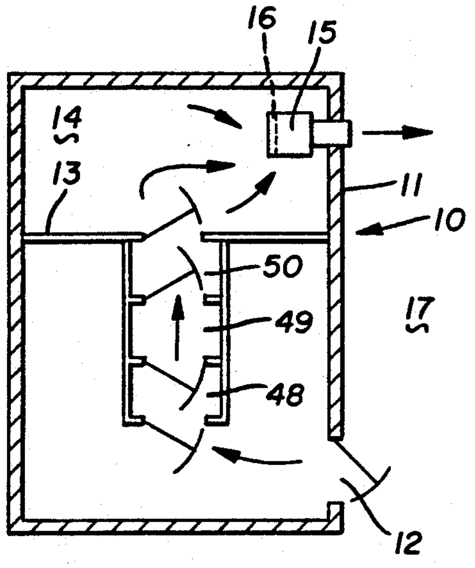
FIG. 1 is a floor plan of a typical negative pressure work space and the improvement to the decontamination system and enclosure within a building.
Figure 7:
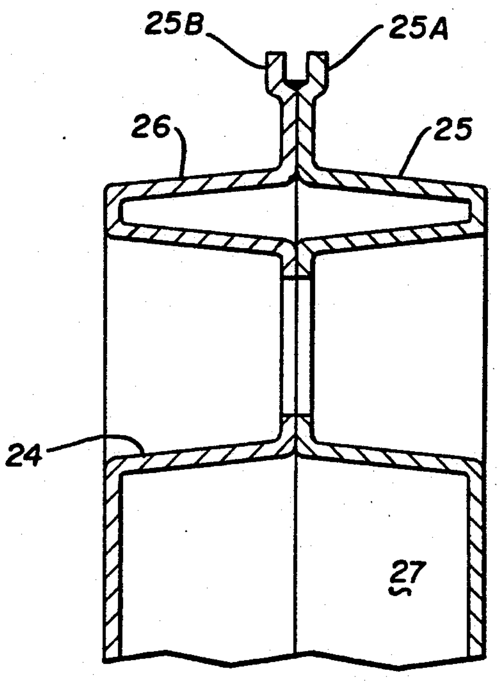
FIG. 7 is an enlarged partial cross-sectional view of a recessed opening in the doorway frame for interconnecting PVC tubing.

As can be seen in FIG. 1 of the drawings, a building 10 is illustrated having a wall 11 with a floor and ceiling. A doorway 12 allows access to the building 10 which is divided by a temporary wall 13 to form a work space 14 in which asbestos is being removed and which may be contaminated with airborne particles. A negative air pressure (sub-ambiant pressure) is maintained within the work space 14 by use of an air exhaust device 15 including a blower equipped with a HEPA filter 16 (high efficiency particulate air) which exhaust to atmosphere generally referred to as 17.

Make-up air enters the work space 14 via a decontamination enclosure 19 which communicates with the work space 14 and the rest of the building 10.

Figure 2:
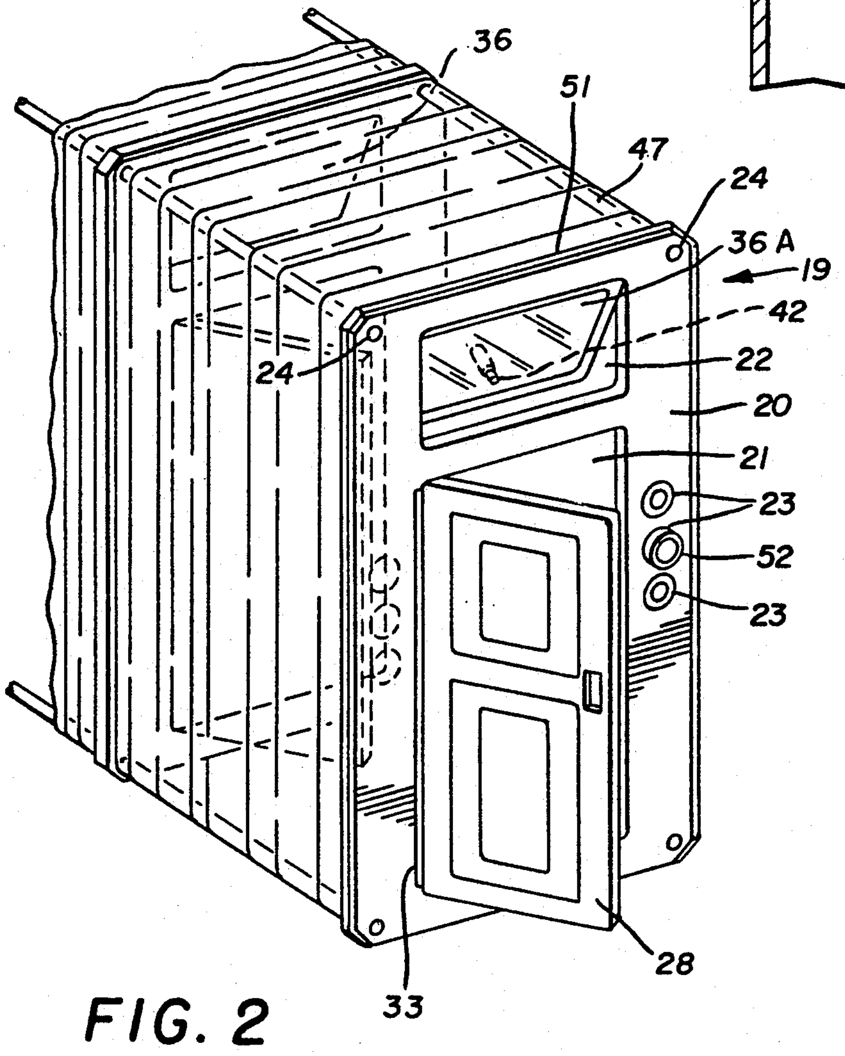
FIG. 2 is a perspective view of a portion of an assembled decontamination chamber.
Figure 8:
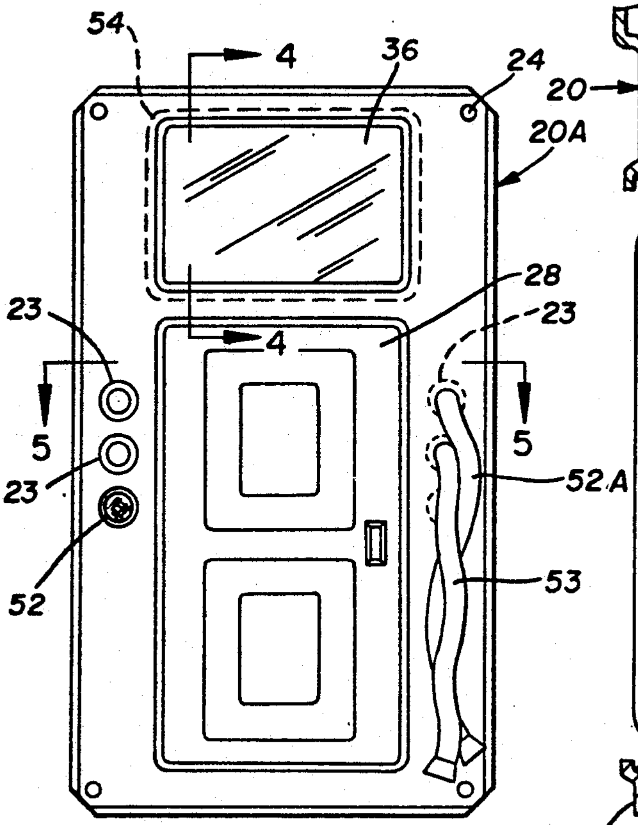
FIG. 8 is a front perspective view of a doorway frame with a HEPA filter within and a transom panel.

The decontamination enclosure 19 is made up of multiple rigid doorway frames 20, best seen in FIGS. 2 and 8 of the drawings having a door opening 21 and a transom opening 22 within. Additionally, each of the doorway frames have three depressions 23 adjacent the door opening 21 and four spaced assembly depression openings 24 one each located at respective corners of said doorway frame 19 both of which will be discussed in greater detail later.

Figure 4:
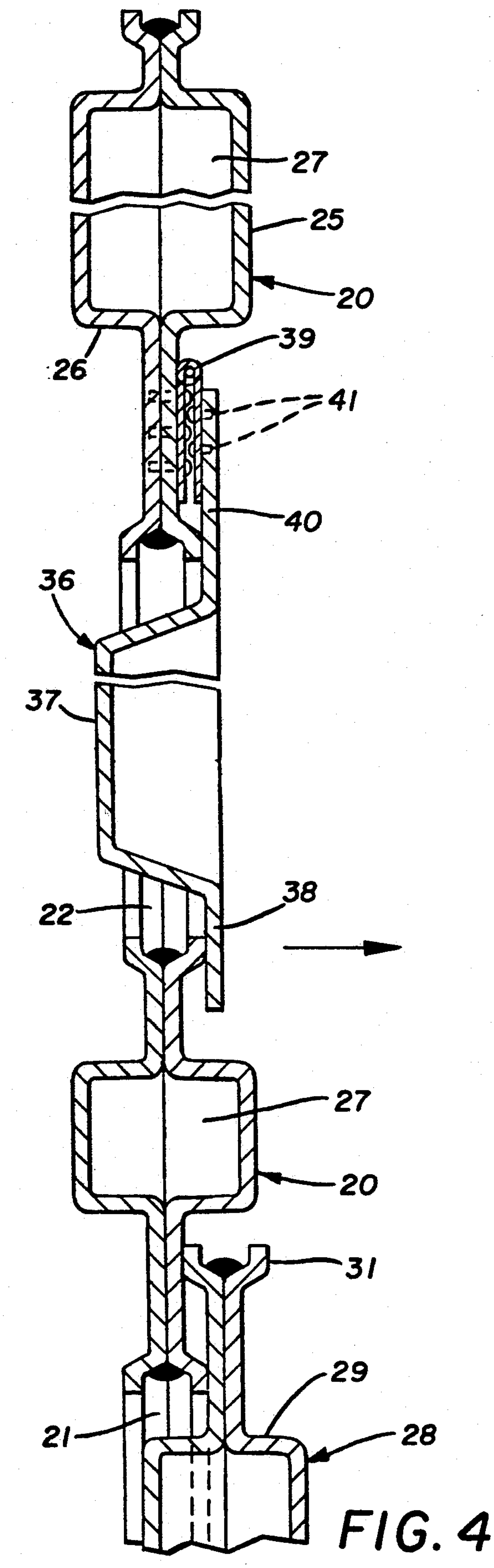
FIG. 4 is an enlarged partial cross-section view of a doorway frame and door within on lines 4—4 of FIG. 8.
Figure 5:
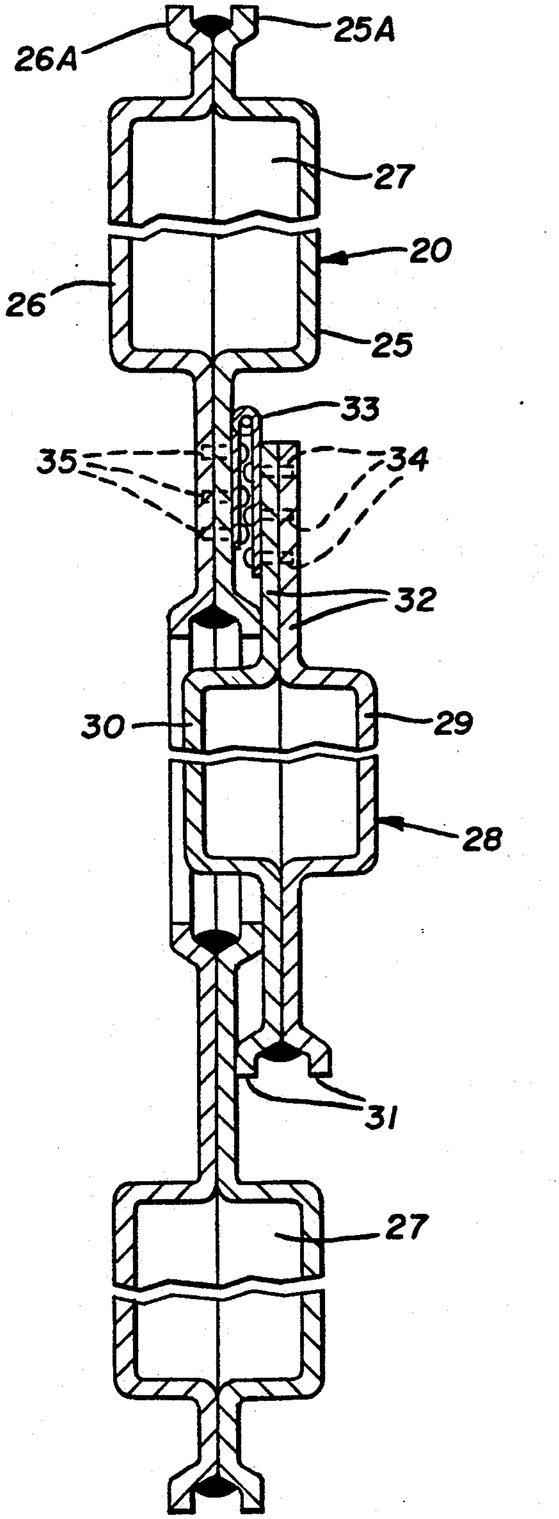
FIG. 5 is an enlarged partial cross-sectional view of the doorway frame and transom within on lines 5—5 of FIG. 8.

Referring now to FIGS. 4, and 8 of the drawings, each doorway frame 20 is comprised of two identical registering contoured frame panels 25 and 26 that are secured to one another along their respective abutting flared flange edges 25A and 26A by welding defining a hollow interior area 26 around the door and transom openings 21 and 22 respectively. A solid door 28 is positioned within said door opening 21 and is formed by securing two registering contoured door panels 29 and 30 together along their respective abutting edges 31 and straight flange edge 32, as best seen in FIG. 5 of the drawings. The solid door 28 is mounted to a continuous self-closing springe hinge 33 by multiple fasteners 34 which in turn are secured to the door frame 20 inwardly along the door opening 21 by fasteners 35. It will be noted that the solid door 28 once mounted will "seal" against the respective flared flanges 25A defining the perimeter of said door opening 21 hereinbefore described.

Figure 3:
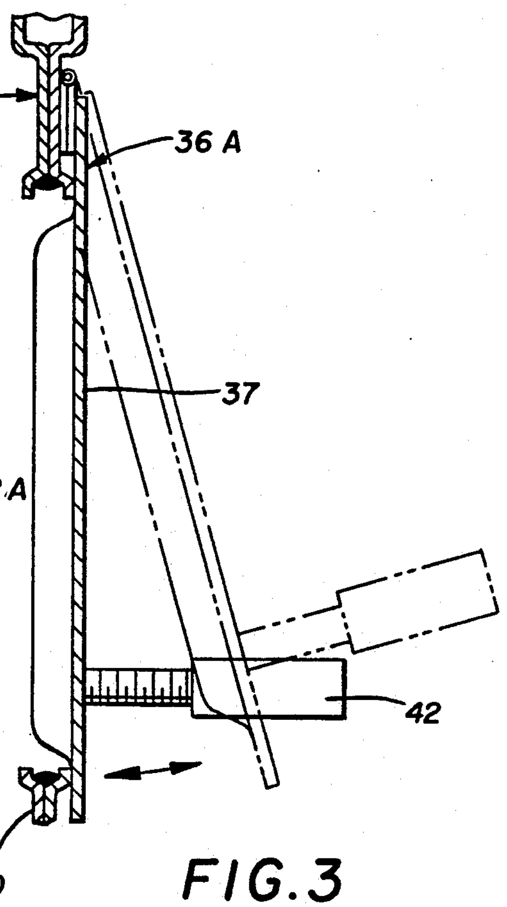
FIG. 3 is an enlarged cross-sectional view of a transom and transom panel within a doorway frame.

Referring now to FIGS. 3 and 4 of the drawings, a transom panel 36 can be seen comprised of a single contoured panel section 37 having a flat perimeter flange 38. The transom panels 36 are generally rectangular and are positioned within the transom openings 22 by a hinge 39 secured to the door frame and to an upper portion 40 of the perimeter flange 38 by a plurality of fasteners 41. An adjustable counter-weight 42 is attached to one transom panel 36A adjacent its perimeter flange 38 in oppositely disposed relation to said upper portion 40 hereinbefore described only in the doorway frame 20 entering the enclosure 19.

By adjusting the relative position of the counter-weight 42 in relation to the transom panel 36A it will vary the airflow pressure required to move the transom panel 36A from a closed position to a open one as seen in broken lines in FIG. 3 of the drawings and thereby adjust the negative air pressure within the work space 14 given the constant operation of the air exhaust devices 15 at a given rate of exhaust to atmosphere.

Figure 6:
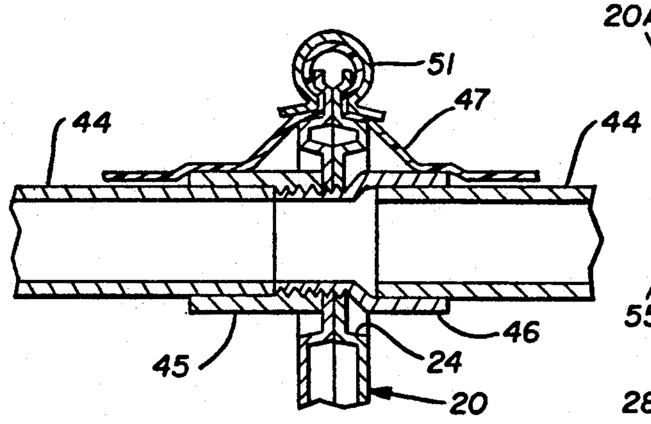
FIG. 6 is an enlarged partial cross-sectional view of a portion of the doorway frame with interconnecting PVC tubing and plastic sheeting secured thereto.

Referring now to FIG. 6 of the drawings, a portion of the doorway frame 20 can be seen wherein the openings defined by the respective assembly depressions 24 provide for attachment with sections of PVC tubing 44 having fittings 45 and 46 which are secured in the ends of each of the tubing sections 44. Each fitting 45 has a threaded bore therethrough and the fitting 46 which are registering nipples are positioned in the bores in the fitting 45 in one of the ends of each of the tubing sections 44 so as to extend outwardly therefrom. The tubing sections 44 are positioned between the rigid doorway frames 20 with the fittings 46 extending through the openings in the hereinbefore described depressions 24 thus interconnecting and supporting the multiple doorway frames 20 in the aligned configuration generally seen in FIG. 2 of the drawings. Plastic sheeting 47 is wrapped around the assembled doorway frames and tubing forming the decontamination enclosure 19 having multiple decontamination chambers 48, 49 and 50 within. The plastic sheeting 47 is secured to the respective edges of the doorway frames 20 by an elongated inverted U-shape clip 51 that engages over the flared flange perimeter edges 25A and 26A efficiently sealing the plastic sheeting 47 to the doorway frames 20.

A HEPA filter unit 52 is positioned within an opening in one of the depressions 23 in each doorway frame 20 as best seen in FIG. 2 of the drawings. The HEPA filter unit 52 can allow for filtered outflow of air through the decontamination chambers 48–50 from the work space 14 should the negative air pressure be lost thereby effectively activating the closing of the transom panels 36A by the counter-weight 42.

In operation, the temporary wall 13 can be formed of plastic sheeting material of any type secured to the respective building surfaces defining the work space 14. The assembled decontamination enclosure 19 is set up so that the first two rigid doors 28 (defining decontamination chambers 48 and 49) within said doorway frames 20 open outwardly from the work space 14. The remaining solid doors 28 defining decontamination chamber 50 and access to the work space 14 open in the opposite direction or towards the work space 14 by reversing the doorway panel 20 and respective transom panel 36 so as to open in the opposite direction thus maintaining the "towards the work space direction". Since all the doors 28 are spring urged to close regardless of the relative air pressure and the direction of opening, they will, in theory, remain closed at all times except for access and exit from the work space. The weighted transom panel 36A respectively mounted in the first rigid doorway frame 20 will always open towards the work space under the inflow pressure of clean outside air and will close automatically upon the loss of negative air pressure within the work space 14.

A reversed doorway frame 20A assembly closest the work space 14 as shown in FIG. 8 of the drawings has two of the remaining depressions 23 within opposite said HEPA filter open for the insertion of auxilliary vacuum hose assemblies 52 and 53 which can be used for the external cleaning of a worker (not shown) within the decontamination chamber 50. It will be evident to those skilled in the art that the auxilliary vacuum hose assembly 52A and 53 will be in communication with one of said blower assemblies 15 equipped with the HEPA filter so as to provide the workers the ability to vacuum themselves when initially leaving the work space 14 within the confines of the initial decontamination chamber 50 often referred to in the industry as the dirty side of a multiple chamber enclosure.

By the utilization of the HEPA filters 52 within each of the rigid doorway panels 20 it will be impossible to maintain a sealed work space 14 upon loss of negative air pressure within, but rather a vented work space 14 in which any contaminated air within will be filtered through the respective multiple HEPA filters 52 which are directionally mounted within the doorways to allow filtered airflow in only one direction thus eliminating any possibility of contamination to the environment upon failure of the negative system hereinbefore described.

Figure 9:
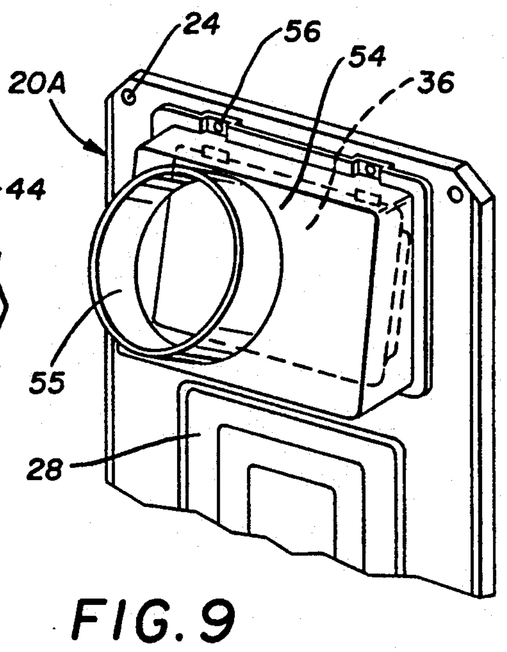
FIG. 9 is a perspective view of a transom manifold on said doorway panel.

Referring now to FIG. 9 of the drawings, a transom manifold cover 54 can be seen that is removably positioned on the reverse doorway frame 20A over the transom opening 22 and hinged transom panel 36 facing the work space 14. The manifold cover 54 is of a contoured one-piece molded body configuration with multiple apertured attachment tabs 56 extending therefrom to secure same to the frame 20A. An annular duct attachment flange 55 extends from said cover 54 defining an apertured access within the cover.

In use, a flexible duct, (not shown) is attached to said flange 55 and a secondary HEPA exhaust unit (not shown) which is positioned within the work space 14. The increase air flow through the decontamination closure 14 delivered by the HEPA exhaust unit through the manifold cover 54 and associated covered transom opening 22 reduces stagnant air areas within the enclosure and insures maximum ventilation therethrough.

Thus it will be seen that a simple lightweight portable negative air pressure control system enclosure has been illustrated and described and it will be apparent to those skilled in the art that various changes and modifications may be made therein without departing from the spirit of the invention, therefore,

I claim:

1. An improvement in a particulate contamination control system decontamination and closure for use with a negative air pressure work space, said work space is defined by a temporary wall means within a building, said wall means having at least one air inlet and outlet for exiting said work space, a filtered and air moving means for producing negative air pressure within said work space, said improvement comprising, an decontamination enclosure having multiple decontamination chambers in communication with said work space, a plurality of rigid doorway frames defining said enclosures, each rigid doorway frame having a spring urged solid door and a solid transom panel movably positioned within, said transom panel pivotally secured to said rigid doorway frame opposite said door, multiple depression areas within each of said rigid doorway frames, a HEPA filter in an opening in one of said depressions in each of said rigid doorway frames, a plurality of interconnecting frame support elements, and fastener means securing said support frame elements to said rigid doorway frames, each of said rigid doorway frames comprised of two identical frame panels having flared flanged edges secured to one another at their respective flared flanged edges, an adjustable weight assembly extending from one of said transom panels towards the work space adjacent said door, plastic film positioned around said rigid doorway frame and said interconnecting frame support elements, a plurality of elongated clips securing said plastic film to said flared flange edges.

2. The improvement in a decontamination enclosure of claim 1 wherein said interconnecting support elements are tubing sections of rigid polyvinyl chloride (PVC).

3. The improvement in a decontamination enclosure of claim 1 wherein said fastening means comprises pairs of registered threaded fittings, one of said fittings extending through said spaced assembly depression openings in respective corners in each of said rigid doorway frames.

4. The improvement in a decontamination enclosure of claim 1 wherein a pair of auxilliary vacuum hose assemblies are secured to openings in said multiple depression areas in one of said rigid doorway frames adjacent said work space.

5. The improvement in a decontamination enclosure of claim 1 wherein at least one of said spring urged solid door in said rigid doorway frame adjacent said work space opens inwardly towards said work space.

6. The improvement in a decontamination enclosure of claim 1 wherein some of said flared flanged edges are in sealing engagement with said solid doors and said solid transom panels when in closed position in said rigid doorway frame.

7. The improvement in a decontamination enclosure of claim 1 wherein said multiple decontamination chamber in communication with the work space has means for increased independent air flow therethrough.

8. The improvement in a decontamination enclosure of claim 7 wherein said mean for increased independent air flow therethrough comprises a transom manifold secured over one of said transom openings, and a secondary HEPA exhaust unit in communication with said transom and manifold.

* * * * *